Aug. 1, 1950 — C. W. PRESTON — 2,517,415
CLUTCH MECHANISM FOR OSCILLATING FANS
Filed Nov. 12, 1948
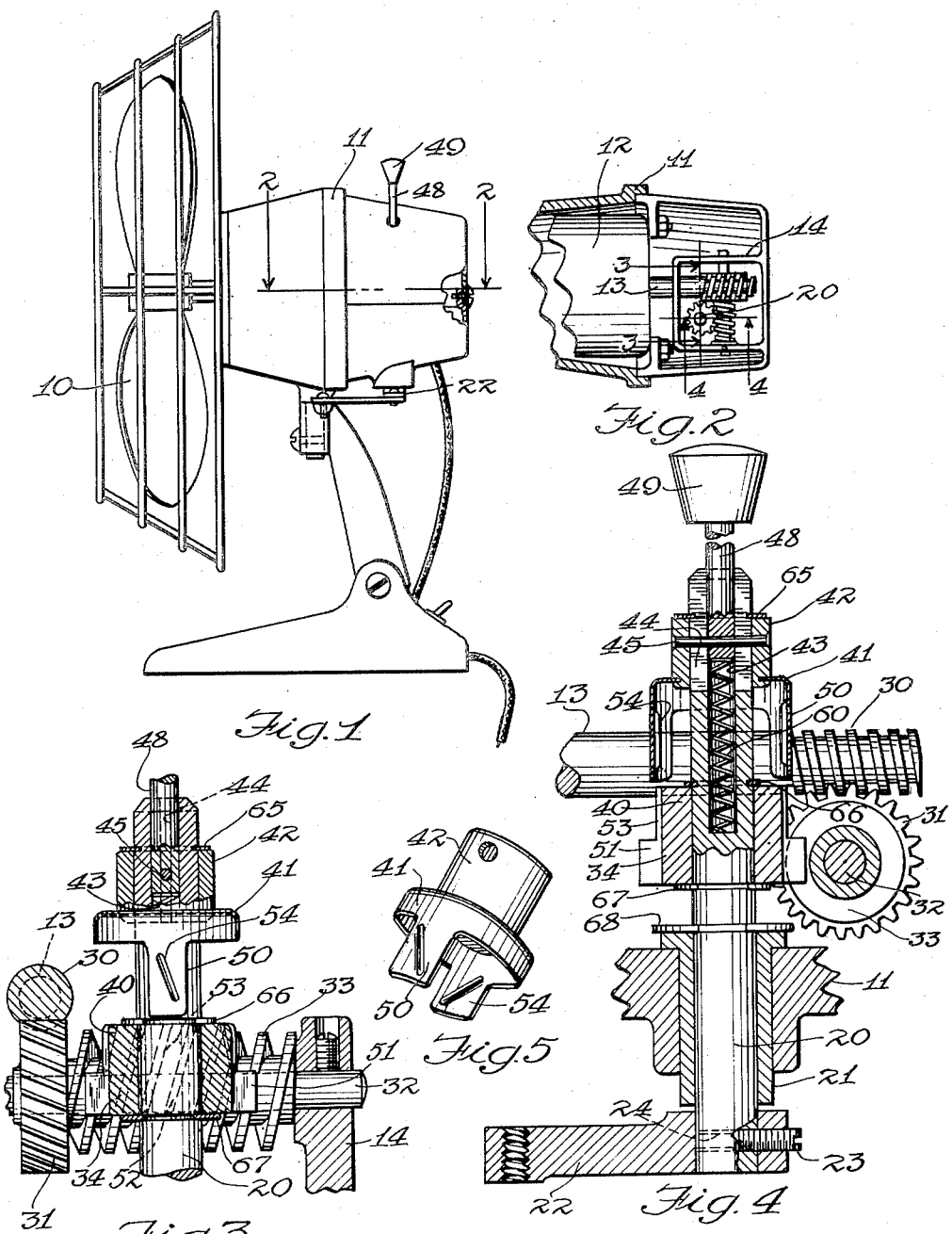
INVENTOR:
Cecil Wilford Preston
BY Miles B. Stewart Co.
Attorneys.

Patented Aug. 1, 1950

2,517,415

UNITED STATES PATENT OFFICE 2,517,415

CLUTCH MECHANISM FOR OSCILLATING FANS

Cecil Wilford Preston, Glen Ellyn, Ill., assignor to Wittie Mfg. Co., Inc., Chicago, Ill.

Application November 12, 1948, Serial No. 59,658

8 Claims. (Cl. 192—56)

My invention relates to clutch mechanisms for drive gearings, and more particularly in relation to oscillating electric fans. Since clutch controls in some makes of oscillating fans are involved or hard of access, it is one object of the present invention to provide a control in the form of a simple knob readily accessible over the motor housing of the fan.

A further object is to provide a clutch to engage or disengage the oscillating drive which is actuated by a short vertical movement of the control knob mentioned above.

Another object is to join the clutch components along a spiral camming path which promotes the automatic disengagement of the clutch in case the oscillating mechanism meets resistance, whereby to save the overloading of the motor and injury to its windings.

A still further object is to interpose a boosting element in the clutch assembly which insures the automatic disengagement of the clutch the moment its components receive a separating or loosening impulse or tendency.

An important object is to combine the novel clutch and the motor drive for the same in a neat and compact assembly.

With the above objects in view, and any others which may suggest themselves from the description to follow, a better understanding of the invention may be had by reference to the accompanying drawing, in which—

Fig. 1 is a side view of a typical electric fan equipped with the novel clutch mechanism;

Fig. 2 is a section in the line 2—2 of Fig. 1;

Figs. 3 and 4 are, respectively, sections on the lines 3—3 and 4—4 of Fig. 3; and Fig. 5 is a perspective view of one of the clutch components.

In accordance with the foregoing, specific reference to the drawing indicates the electric fan at 10, and its motor housing at 11. The motor is shown at 12; and its shaft 13 extends into a frame 14 forming an internal part of the motor housing.

A conventional oscillating mechanism includes a vertical shaft driven at slow speed by a gearing from the motor, the shaft carrying an external crank whose motion relative to a pivoted link induces the oscillatory movement of the motor housing. The vertical shaft referred to is also employed in the present mechanism and shown at 20. It turns in a bushing 21 lodged in the bottom of the motor housing and depends from the latter to receive the crank 22. The crank is made fast by receiving a screw 23 which is driven into a tapped shaft bore 24.

The drive from the motor shaft 13 to the vertical shaft 20 starts with a worm 30 made on the free end of the motor shaft. The worm 30 engages a gear 31 carried by a cross-shaft 32 journaled in the frame 14, the cross-shaft also carrying a worm 33. A gear 34 is rotatably mounted on the vertical shaft 20, such gear being in mesh with the worm 33. A double speed reduction drive is thus transmitted from the motor shaft to the gear 34.

Connected as described, the gear 34 is in constant rotation when the electric fan is in operation; and being free on the vertical shaft 20, the gear transmits no motion to the same, so that no oscillatory movement is imparted to the motor housing. It is therefore the province of the novel clutch mechanism to engage the gear 34 with the shaft 20 at such time as the oscillatory movement is desired.

To form the clutch, the gear 34 is extended upwardly with a hub 40 which constitutes the driving component of the clutch. The driven component is a clip 41 carried by a sleeve 42 which is slidable vertically along the shaft 20. The latter is made with a deep axial bore 43 from its upper end; and the upper portion of the shaft is divided to form slot sections 44 through which passes a cross-pin 45 lodged endwise in the walls of the sleeve 42. The latter is thus locked against turning relative to the shaft 20.

The upper part of the shaft bore 43 slidably receives a stem 48 whose upper end carries a finger knob 49. The cross-pin 45 also passes through the stem 48, forming a connection between the stem and the sleeve 42, and enabling the knob to be used as a control to lower the sleeve from—and return it to—the position shown in Figs. 3 and 4.

The clip 41 is circular in form and extended downwardly with a pair of diametrically spaced prongs 50. These are designed to receive the gear hub 40 between them when the clip is lowered upon the same. The proper design of the teeth 51 of the gear 34 is with a lateral twist or inclination, as indicated at 52; and the teeth are continued with the same inclination, but merely as ribs 53, across the periphery of the hub 40. The prongs 50 are designed to mount a number of the ribs 53 with sliding engagement as the clip 41 is lowered on the hub 40. The prongs 50 are pressed with a pair of inward ribs 54 directed similarly to the hub ribs 53 and designed to lodge between pairs of these when the clip is lowered as stated. This action connects the gear 34 rotatably with the clip, engaging the clutch to induce the oscillatory movement of the fan. It follows that the manual raising of the knob 49 will dis-connect the clutch when the oscillatory movement of the fan is no longer desired.

The clutch engagement described above forms a sufficient positive drive between the gear 34 and the shaft 20 under normal conditions. However, in case some obstacle or undue friction impedes the rotation of the shaft, an overload would be imposed on the motor 12 and its windings injured. To guard against such an eventuality, the ribs 53 and 54 act to automatically disconnect the clutch when the shaft 20 offers undue resistance to the turning influence of the gear 34. In such event, the ribs 53 impinge laterally on the ribs 54 as cams—as the gear rotates in the direction indicated by the arrow in Fig. 3—and crowd the prongs 50 in separating directions. This action frees the clip slightly from the hub ribs 53 and also imposes an upward influence on the clip by the spiral pressure between the ribs 53 and 54. Now a compression spring 60 in the shaft bore 43 acts as a booster on the stem 48, raising the clip 41 clear of the hub 40, so that the clutch is automatically disengaged.

While any suitable method of assembly may be employed for the parts associated with the shaft 20, I have chosen a number of split collars as retaining means for several of the parts. Thus, such a collar 65 is employed as a top limiting retainer for the sleeve 42; and top and bottom collars 66 and 67 are employed as limits for the gear 34. Finally, a collar 68 supports the shaft on the bushing 21.

In conclusion, it will be apparent that the novel mechanism provides a handy control for securing or stopping the oscillating movement of the fan. The mechanism is entirely contained within the motor housing, where it is protected from dust and impact by other objects. Further, the novel clutch is safeguarded against an overload by simple and automatic means. Further, the clutch is applicable to other appliances and gearings. Finally, the mechanism employs the fewest parts consistent with efficient construction and operation.

While I have described the invention along specific lines, various minor changes or refinements may be made therein without departing from its principle, and I reserve the right to employ all such changes and refinements as may come within the scope and spirit of the appended claims.

I claim:

1. A clutch mechanism between a power drive and a driven shaft comprising a member operated by said drive and rotatable on the driven shaft, a clutch unit movable along the shaft toward and from said member, the latter having a series of peripheral projections extending in substantially longitudinal directions, opposed tongues carried by said unit and adapted to frictionally surmount said projections when the unit moves toward the member and inward projections from said tongues assuming positions between pairs of said peripheral projections in such event.

2. The structure of claim 1, and means to join said unit for rotation with the shaft.

3. The structure of claim 1, said projections being ribs.

4. The structure of claim 1, said tongues being tensionable and their projections formed as cam ribs influenced by the member projections to spread the tongues when the shaft offers undue resistance to the rotary effort of the member, whereby to slightly disengage the tongues from the member projections.

5. The structure of claim 1, said tongues being tensionable and their projections formed as cam ribs influenced by the member projections to spread the tongues when the shaft offers undue resistance to the rotary effort of the member, whereby to slightly disengage the tongues from the member projections, and means effective to retract the clutch unit from the member in such event.

6. The structure of claim 1, said projections being inclined ribs, the tongues being tensionable and their ribs formed as cams influenced by the member ribs to spread the tongues when the shaft offers undue resistance to the rotary effort of said members, whereby to slightly disengage the tongues from the member ribs, and the inclination of the ribs imposing an influence to retract the clutch unit from the member.

7. The structure of claim 1, said projections being similarly inclined ribs, the tongues being tensionable and their ribs formed as cams influenced by the member ribs to spread the tongues when the shaft offers undue resistance to the rotary effort of said members, whereby to slightly disengage the tongues from the member ribs, and the inclination of the ribs imposing an influence to retract the clutch unit from the member.

8. The structure of claim 1, said member having one end portion as a worm gear, the member projections being reduced continuations of the gear teeth, and the tongue projections being ribs inclined as said continuations.

CECIL WILFORD PRESTON.

REFERENCES CITED

The following references are of record in the file of this patent:

UNITED STATES PATENTS

| Number | Name | Date |
| --- | --- | --- |
| 562,816 | Forth | June 30, 1896 |
| 1,222,512 | Aalborg | Apr. 10, 1917 |
| 1,517,168 | Rogers | Nov. 25, 1924 |
| 1,648,996 | Reibel | Nov. 15, 1927 |
| 2,094,971 | Lurdy | Oct. 5, 1937 |